US00RE38976E

(19) United States
(12) Reissued Patent
Raming

(10) Patent Number: US RE38,976 E
(45) Date of Reissued Patent: Feb. 14, 2006

(54) METHOD OF LABELING A PACKAGE

(75) Inventor: Bruce Raming, Northbrook, IL (US)

(73) Assignee: Ward-Kraft, Inc., Fort Scott, KS (US)

(21) Appl. No.: 10/405,845

(22) Filed: Apr. 2, 2003

Related U.S. Patent Documents

Reissue of:
(64) Patent No.: 6,213,518
Issued: Apr. 10, 2001
Appl. No.: 09/560,449
Filed: Apr. 28, 2000

U.S. Applications:
(62) Division of application No. 09/317,749, filed on May 24, 1999, now Pat. No. 6,186,554.

(51) Int. Cl.
*B42D 15/00* (2006.01)

(52) U.S. Cl. ..... 283/81; 156/249; 229/74; 283/79; 283/101; 283/105; 428/41.8; 428/42.2; 428/43; 462/26; 462/27

(58) Field of Classification Search ..... 283/67, 283/79, 80, 81, 101, 105, 106; 229/74, 92.8; 428/41.8, 42.2, 42.3, 43; 462/26, 27; 156/1, 156/248, 249, 253, 289
See application file for complete search history.

(56) References Cited

U.S. PATENT DOCUMENTS 3,315,387 A * 4/1967 Heuser ..... 40/2
4,368,903 A * 1/1983 Jones ..... 283/21
4,544,590 A * 10/1985 Egan ..... 428/41.4
4,927,179 A * 5/1990 Ehret et al. ..... 283/79
4,928,875 A * 5/1990 Hutchinson
4,940,258 A * 7/1990 Cuba, Jr. et al. ..... 283/81
4,953,780 A * 9/1990 Ross ..... 229/92.8
5,289,972 A * 3/1994 Sauerwine et al.
5,370,420 A * 12/1994 Khatib et al.
5,413,383 A 5/1995 Laurash et al.
5,653,472 A * 8/1997 Huddleston et al.
5,730,469 A * 3/1998 Heimerdinger et al.
5,893,512 A * 4/1999 Diedrich ..... 229/92.1
5,984,778 A * 11/1999 Murphy ..... 462/27
6,110,554 A * 8/2000 Moeller et al. ..... 283/81
RE37,521 E 1/2002 Laurash et al.

OTHER PUBLICATIONS

Blue print packing labels manufactured at least as early as Jul., 1997.*

* cited by examiner

*Primary Examiner*—Monica S. Carter
(74) *Attorney, Agent, or Firm*—Hovey Williams LLP

(57) ABSTRACT

A business form is provided which is particularly useful in shipping products where certain preprinted information can be provided and then individualized information is printed before the form is applied to a substrate. The form includes a face ply which has a pattern of adhesive applied to at least a portion of the inner face, and a release liner which includes a pattern of adhesive which exposes a portion of the release liner to direct adhesive contact to the face ply without intervening release coating to permanently adhere a part of the release liner to the face ply. The release liner has a surrounding protective border provided with release coating on the release face thereof and which is removed prior to application to the substrate, and a slip which remains with the form as applied to the substrate. The face ply includes lines of perforation defining a central portion. At least a part of the central portion is directly adhered by the adhesive to the slip without intervening release coating between the adhesive and the slip or the central portion. Individualized indicia, such as an address, may be printed on a label area of the top face of the central portion, while other individualized indicia, such as the content of a package, may be printed on the back face of the slip. Masking indicia is preferably provided on one of the inner face of the top ply or the release face of the release liner to inhibit viewing of the content indicia until the slip is removed from the package.

9 Claims, 5 Drawing Sheets

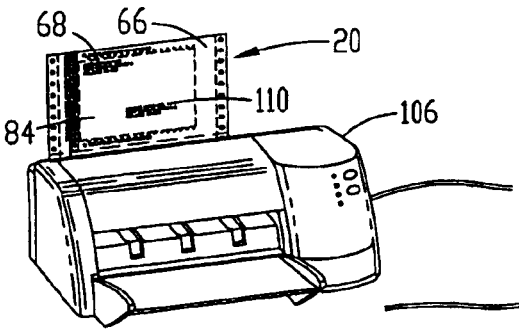
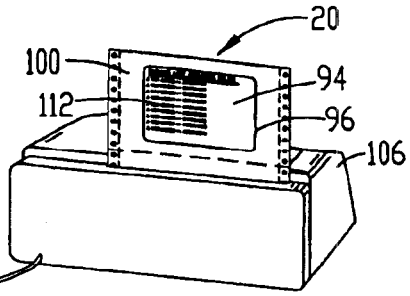
Fig. 1. Fig. 3. Fig. 2.
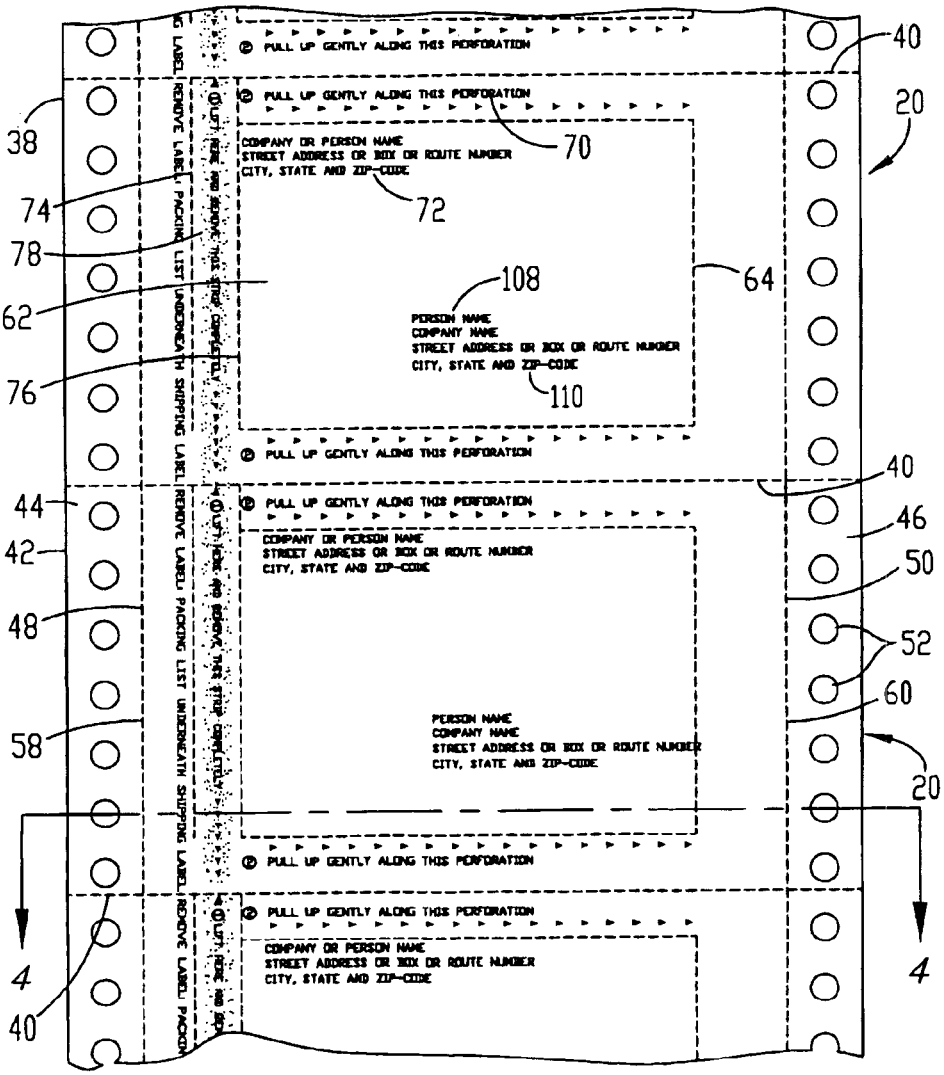

METHOD OF LABELING A PACKAGE

Matter enclosed in heavy brackets [ ] appears in the original patent but forms no part of this reissue specification; matter printed in italics indicates the additions made by reissue.

This is a divisional application of application Ser. No. 09/317,749 filed May 24, 1999.

BACKGROUND OF THE INVENTION

1. Field of the Invention

This invention broadly concerns a business form adapted for receiving variable printing of information on both sides of the form an subsequent attachment to a substrate. In one particular usage, it is more particularly concerned with a business form which may be used as a combination address label and packing list for use in shipping articles to a customer, and may include a return label portion.

2. Description of the Prior Art

The use of adhesive labels has become a growing segment of the business forms industry with the emergence of catalog sales and other home shopping vehicles. In addition to traditional wholesale shipments and delivery to commercial accounts, consumers increasingly elect to make purchases through telephone solicitations, through global computer networks, and catalogs. Shippers have thus looked for methods of increasing the efficiency of the shipping and handling process.

A variety of different labels have heretofore been developed for use in shipping products. These labels increasingly use ready to apply adhesives such as pressure sensitive adhesives, rather than adhesives which require wetting for activation, because of greater reliability of adhesion and ease of application. Such ready-to-use adhesives typically require the use of a coated liner to prevent premature adhesion, the liner being discarded as waste. However, with the increased need for security and efficiency in the shipping of packages, there has arisen a need for improved business forms which will minimize the number and size of the sheets in the form, while providing for selective adhesion to the underlying substrate and security in regard to the contents of the package, and also matches the shipping label and contents set forth on the packing list.

SUMMARY OF THE INVENTION

These needs have largely been met by the duplex carton label/packing list of the present invention. That is to say, the present invention provides a simple and economical business form which is easy to use, provides good adhesion to the underlying package or other substrate, limits waste, minimizes the number of sheets required in the form by performing multiple functions and provides good security by limiting the ability to view the packing list after application to the package. A portion of the liner sheet also functions as a packing list, thus limiting the number of plies necessary during manufacture and use. Moreover, the invention contemplates duplex printing of the liner in a single pass through a printer, so that both the addressee information and the packing list can be simultaneously printed on the form which is then ready to use. Lines of weakness and separation are provided in the face ply and release liner to permit access by the recipient to desired portions while the remainder stays affixed to the substrate. Adhesive is selectively applied in patterns between the face ply and the backing ply to provide good adhesion to the substrate without overextending into the areas serving as the packing list.

Broadly speaking, the present invention includes a face ply having a top face and an inner face and a release liner having a release face which is pattern coated with silicone release liner to provide both coated and uncoated regions, and a printable back face. Adhesive, such as a pressure-sensitive adhesive, is applied in a pattern between the plies. Preferably, the patterning of adhesive and silicone release coating provides areas between the face ply and release liner which are free of both silicone coating and adhesive, and some areas which have adhesive only to provide permanent adherence between the plies. Lines of perforation or separation are preferably provided in the face ply to define a central portion which may be further divided by perforation lines for use as an address label, return label, or pull tabs, and a surrounding border portion for adhering to the substrate, as well as a tear strip for facilitating access to the central portion. The release liner may be provided with lines of perforation or separation to permit removal of the release liner in a surrounding border for adherence to the substrate, and a remaining packing label or list portion.

In preferred embodiments, the placement of the adhesive and silicone release can be varied to provide alternate configurations for the label. For example, in a first embodiment, the central label portion can be of double thickness by providing adhesive but not silicone release between the face ply and the release liner in the central label area. This yields a document suitable for filing and a more durable label which has greater tear resistance. In a second embodiment, the label portion may be divided by lines of perforation or severance so that a double thickness end tabs are provided, but single thickness address labels and return address labels are provided separate from a printable area on the release liner. It is desirable that one of the inner face and release face be printed with ink so as to cover and visibly screen the printing appearing on the printable back face of the liner to prevent viewing after application to the package without removal from the package.

The duplex carton label/packing list is easy to use. After preprinting each of the face ply and release liner as desired, applying the silicone liner and adhesive in the desired patterns, and making the appropriate perforation lines and lines of separation through perforation wheels or die cutting, for example, the forms, which are preferably provided as continuous webs separated into individual forms by transverse perforations, are ready for local use. The user inserts the form into an ordinary printer where no stylus is required. Most preferably, duplex printers for simultaneously printing both the back face and top face are used, although the form permits sequential printing on top face and back face. Thus, computerized information can quickly be printed giving both the recipient's address on the top face and the packing list on the back face. Either continuous feed or cut sheet versions can be used. The perimeter portion of the release liner is removed and the remainder of the form is then applied to the package, with the address visible on the top face. When the package arrives at the recipient, access is gained to the packing list by placing a finger under one edge at a designated location between the tear strip perforations and pulling on the tear strip. The central portion is then pulled free through die cuts on the release liner and perforations or other lines of weakness in the face ply, exposing the rear of the central portion as a packing list while the remainder of the form is adhered to the package.

As a result, high volumes of labels and packing lists can be generated as a single form, as a single pass through a high-capacity duplex printer can generate and print the necessary information. As no carbon paper or other transfer media is employed to reprint the image on different plys, no stylus is necessary and ink-jet, laser or thermal-transfer printers may be used. The form can be preprinted with the exception of the individualized information to save time. Application of the address label and packing list to the package simply requires removal of the protective portion of the release liner, preferably located around the perimeter of the central area, and application to the package. This avoids the possibility that the packing list and address label will be separated and misapplied to different substrates. Upon receipt, the user grasps the tear strip which separates from the backing to allow the central area to be torn free and exposing the back face of the central area bearing the printing showing the contents or other information to be revealed to the recipient. The label is also tamper evident, such that the recipient can readily see tears to the form if others have sought access to the information on the back face.

The principal benefits and uses of the present invention will be readily apparent to those skilled in the art with reference to the following description and the drawings appended hereto.

BRIEF DESCRIPTION OF THE DRAWINGS

FIG. 1 is a front perspective view of the form of the present invention in a duplex computer printer;

FIG. 2 is rear perspective view of the form and printer shown in FIG. 1;

FIG. 3 is a front elevational view showing a continuous form of the present invention;

DESCRIPTION OF THE PREFERRED EMBODIMENT

Figure 4:
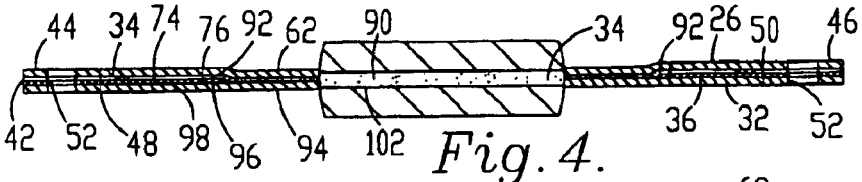
FIG. 4 is a sectional view along line 4—4 of FIG. 3, with a central area enlarged for clarity.

Referring now to the drawing, a composite address label and packing list form 20 particularly suited for local duplex printing is shown in FIG. 3 and includes a face ply 22 and a release liner 24. The face ply 22 has a top face 26 and an inner face 28 oriented toward the release liner 24, and the release liner has a release face 30 oriented toward the face ply 22 and a back face 32. Adhesive 34 and a silicone release coating 36 are applied in patterns between the face ply 22 and the release liner 24 to permit selected attachment of the face ply to the release liner in some areas and to facilitate separation in others. Printing as well as lines of perforations or full severance by cutting are provided in certain areas of the face ply 22 and release liner 24 to provide the form 20 hereof. Advantageously, some of the printing may be accomplished during manufacture, while other printing on the forms is individualized on a form-by-form basis.

It may be appreciated that the form 20 as shown in FIG. 3 is illustrated as a continuous web 38 of a connected series of forms 20 separated by cross-perforation lines 40 through both the face ply 22 and the release liner 24 into the individual forms 20. This construction permits fan-folding of multiple forms and continuous feed during printing. When provided as a continuous web 38, the forms 20 may initially include a control margin 42 along one or both longitudinal sides with feed strips 44 and 46 defined by longitudinally extending lines of weakening 48 and 50, the feed strips 44 and 46 being provided with tractor feed holes 52. However, the form 20 may also be provided in individual cut sheets rather than as a continuous web of connected forms, dispensing with the need for the feed strips 44.

Figure 8:
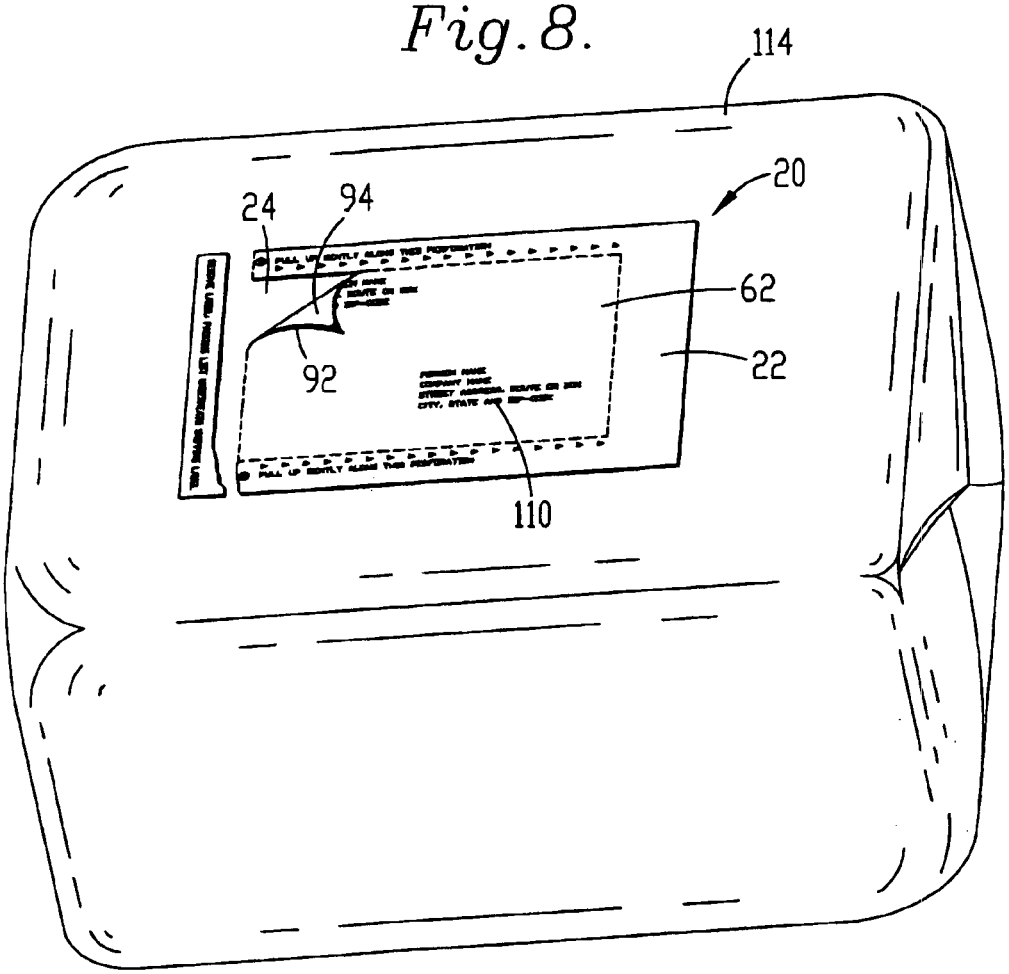
FIG. 8 is a perspective view of the form of FIG. 5 after removal of the tear sheet and separation of the central packing list portion.

In greater detail, form 20 includes a top margin 54, a bottom margin 56, and side margins 58 and 60. The face ply 22 includes a central portion 62 for functioning as an address label 64 and a surrounding border portion 66 positioned outboard of said central portion for attachment to a substrate such as a package, as shown in FIG. 8. As used herein, "inboard" relates directionally to the inner or central part of the form inwardly of the margins, while "outboard" refers directionally toward the area more proximate the margins. The face ply 22 may include preprinted indicia 68 including, for example, instruction indicia 70 for using the form 20 and identifying indicia 72 for identifying the sender. Spaced apart first and second tear strip perforation lines 74 and 76 are provided in the face ply 22 and extend from the top margin 54 almost to the bottom margin 56 to provide therebetween a rear strip 78. Central portion 62 is defined within the top ply by tear strip perforation line 76 and by spaced-apart first and second transverse perforation lines 80 and 82 generally parallel to the top and bottom margins and by label perforation line 84 generally parallel to side margins 58 and 60. Border portion 66 generally lies between the side margin 58 and tear strip 78, and between top margin 54, bottom margin 56, and side margin 60 and central portion 62.

Adhesive [54] *34* is strategically applied in pattern between the face ply and the release liner. Preferably, the adhesive is a pressure sensitive adhesive, and is applied in a border pattern 86 on the inner face 28 of the face ply 22 beneath the border portion 66, but preferably recessed about 1 mm outwardly from the perforation lines 74, 80, 82 and 84 to resist adhesive migration and undesired attachment between the face ply 22 and the release liner 24. The border adhesive pattern 86 is not continuous in that part of the border portion 66 on the inner face 28 which is between tear strip perforation lines 74 and 76 except for a patch 88 of adhesive shown in FIG. 5 to facilitate access to the tear strip 78 by the user but inhibit premature separation of the face ply 22 from the release liner 24. A second, label adhesive pattern 90 is applied to the inner face of ply 22 spaced interiorly of the perforation lines 76, [78,] 80, *82* and 84 to provide an adhesive free ring 92. A packing slip 94 is provided by a die-cut line of separation 96 in the release liner. The adhesive-free ring preferably extends from about 1 mm outwardly of perforation lines [78,] *76,* 80, *82* and 84 to about 1 mm inside the line of separation 96, thus not only avoiding adhesive build up on cutting members during manufacture but also aiding in separation of the label and packing slip from the remainder of the form 20. The adhesive 34 may be applied within adhesive patterns 86 and 90 in a continuous coating or as an intermittent coating to vary the amount of adhesion desired.

Silicone release coating 36 is applied over the release face 30 of the release liner in a release pattern 98. The release pattern 98 preferably overlies the protective border 100 of the release liner 24 and extends slightly inboard of the line of separation 96. However, at least a part of the release face 30 interiorly within the line of separation 96 is not included in the release pattern 98, whereby direct adhesive connection is provided between the face ply 22 and the release liner 24 without any release coating therebetween. Preferably, this release-liner free area 102 is recessed about 1 mm interiorly of the circumscribing line of separation so that release coating is provided on the protective border 100 and across the line of separation 96. As a result, the central portion 62 providing an address label of the face ply 22 is securely and substantially permanently bonded to the packing slip 94 in a two ply construction, with the remainder of the face ply 22 and release liner 24 outboard therefrom separable because any adhesive 34 on the face ply 22 contacts the release coating 36 and does not directly contact the release liner 24.

Preferably, the preprinted indicia 68 includes a printed masking area 104 printed on the inner face 28, or alternatively on the release face 30. The indicia printed on form 20 to provide the masking area 104 is most preferably provided by ink or other visible coating which minimizes the transparency and translucency of the area to which it is printed. The printed indicia is the masking area 104 may be either continuous printing, as shown, or masking indicia as shown in U.S. Pat. No. 5,376,048 (the disclosure of which is incorporated herein by reference) as masking printing 31 or masking indicia 48, and preferably covers more than 50% of the surface area within the line of separation 96. That is to say, the actual ink coating is applied in a pattern or continuous coverage in the masking area effectively prevents viewing through the face ply 22 to see any printing on the back face 32 of the release liner 24.

In use, the form 20 is fed through a printer 106 as shown in FIGS. 1 and 2 whereby individualized indicia 108 is printed on each form 20. While the top face 26 may be printed and the form 20 removed and reversed to present the base face 32, the form 20 is most efficiently employed using a duplex printer 106 whereby in the same pass through the printer, individualized indicia in the form of address indicia 110 may be printed on the face ply 26 while at the same time content indicia 112 may be printed on the back face 32. Because no transfer medium is employed, ink jet printers, laser printers, thermal printers or other non-stylus printers may be employed as well as typewriters, dot matrix, daisy wheel or other stylus-type printers.

Figure 5:
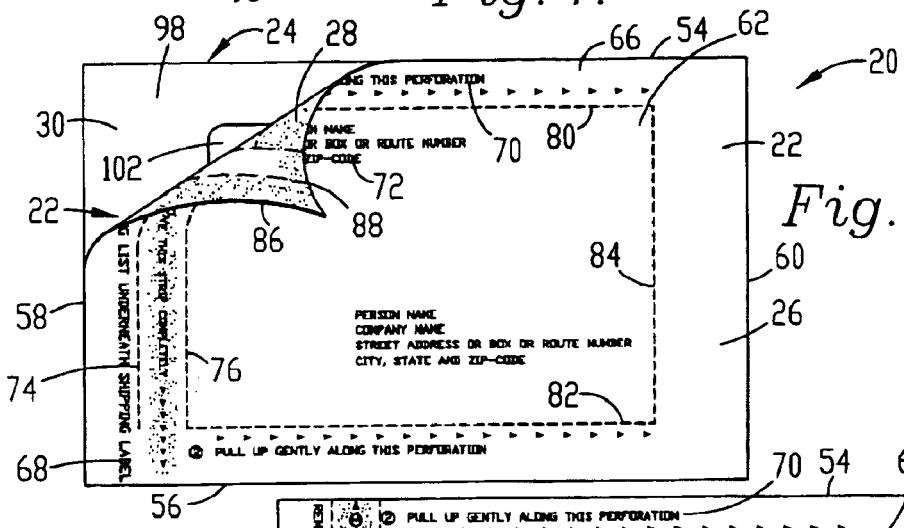
FIG. 5 is a front elevational view of a form separated from adjacent forms after individualized printing, with the protective portion of the release liner being separated to ready the form for application to a package or other substrate.
Figure 6:
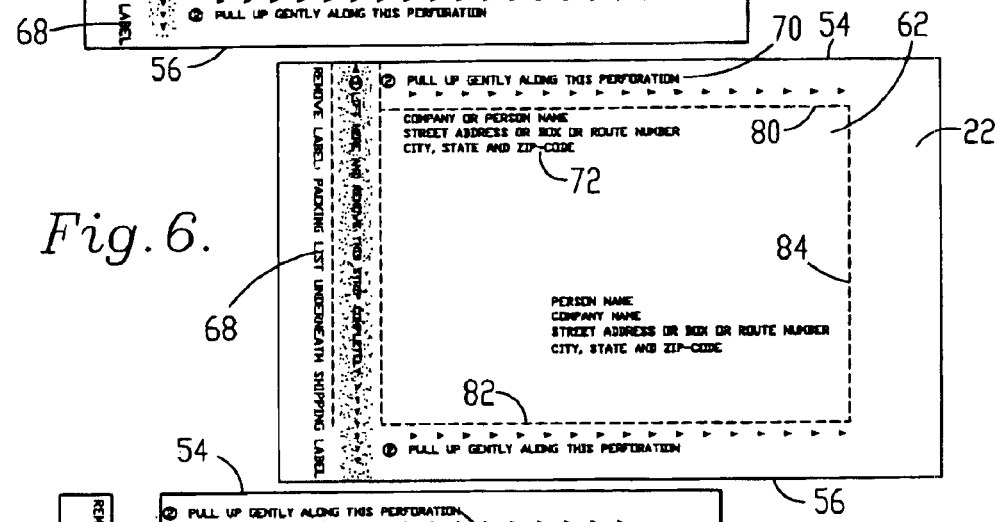
FIG. 6 is a front elevational view of the form of FIG. 5 as applied to a substrate.
Figure 7:
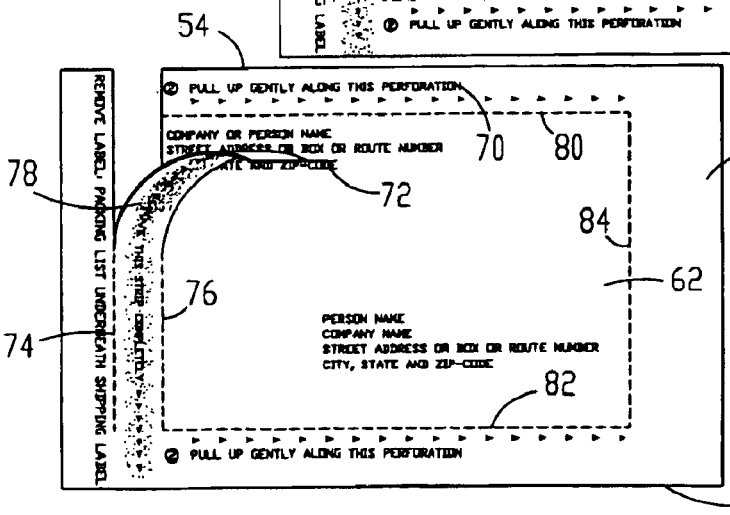
FIG. 7 is a front elevational view of the form of F ig. 5 showing removal of the tear strip along perforations in the face ply for removal of the central portion.
Figure 9:
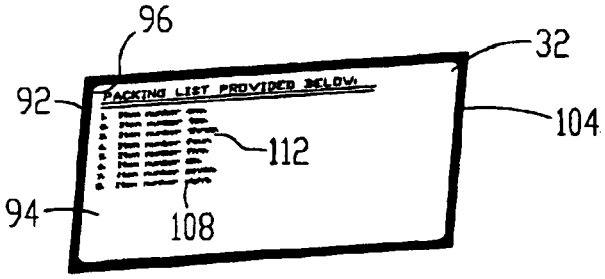
FIG. 9 is a rear elevational view of the central portion of the form of FIG. 5 after removal from the package to show the individualized packing list information.

After the individualized indicia 108 is printed, the protective border 100 is peeled away from the border portion 66 of the face ply 22 of form 20 as shown in FIG. 5. This exposes the adhesive so that the form 20 may be securely adhered to a substrate, such as a package 114 as shown in FIG. 8. FIG. 6 shows the form 20 as applied to the package in FIG. 8, and as may be seen in FIGS. 6 and 8, the address label 64 presenting the address indicia 110 is clearly visible, while the content indicia 112 printed on the back face 32 is obscured from view. The construction and method of application substantially ensure a match between the intended recipient and list of contents, avoiding the possibility of mixing up an address label and a packing list because from the time of printing to application, the two are not separated or separable. This inhibits the likelihood of incurring the substantial costs and onerous tasks associated with mismatched labels and packages. Access to the back face 32 is only possible by tearing the tear strip 78 along tear strip perforation lines 74 and 76, as shown in FIG. 7. By tearing the tear strip 78 and then pulling up the central portion 62 along the perforation lines 80 and 82 as directed by the instruction indicia 70, the recipient gains access to the address label 64 bonded to the packing slip 94. The two plies of the bonded central portion 62 resist tearing and aid in maintaining the packing slip intact during tearing from the border portion. The recipient then need only tear along the label perforation line 84 to remove the packing slip 94 from the package 114, and thereby review the information on the back face 32 as shown in FIG. 9. Tampering is evidenced by tearing of the perforations 74, 76, 80, 82, or 84, or around the border portion 66.

A second embodiment is shown as form 120 and is in many respects similar in construction and use to form 20. To the extent that elements referenced above with respect to form 20 are shown or described with respect to form 120, the reference characters are the same. The form 120 shown in FIG. 10 is illustrated as a cut-sheet form but could also be provided as a continuous web of forms separated by cross-perforation lines and having feed strips as discussed with reference to form 20.

Figure 10:
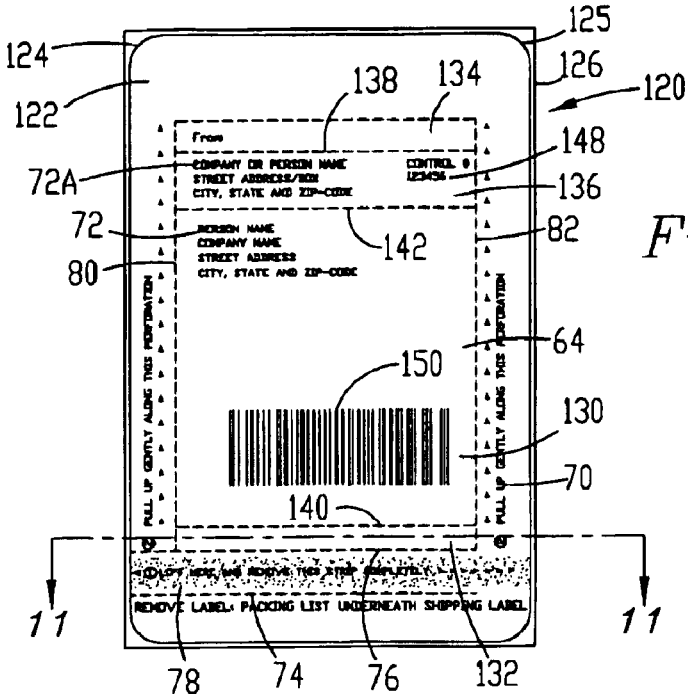
FIG. 10 is a front elevational view of a second embodiment of the present invention, showing additional perforation lines in the face ply to provide segregated areas for pull tabs and return address labels thereon.
Figure 11:
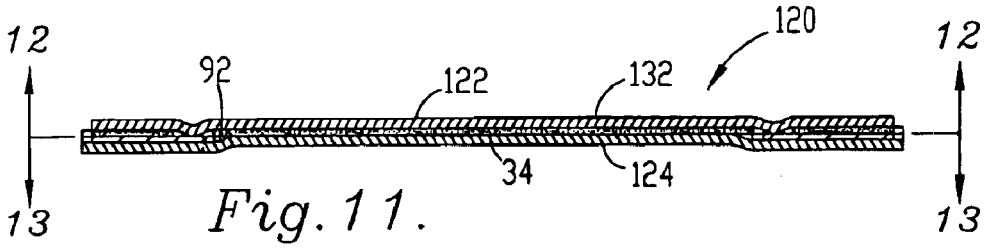
FIG. 11 is an enlarged cross-sectional view taken along line 11—11 to show the pattern application of adhesive and release coating between the face ply and the release liner and reverse printing to aid in masking the information on the release liner.

Form 120 has a face ply 122 and a release liner 124, wherein the face ply 122 has a surrounding margin 125 recessed interiorly of the perimeter 126 of the release liner 124 as shown in FIG. 10. The provision of a recessed area [128] provides ease of separation of the protective border 100 during use of the form 120. Additionally, the central portion 130 includes not only the address label 64 but also pull tabs 132 and 134 and a return label 136, defined by pull tab perforation lines 138 and 140 and another release label perforation line 142 which are parallel to label perforation line 84 and extend between transverse perforation lines 80 and 82.

Figure 12:
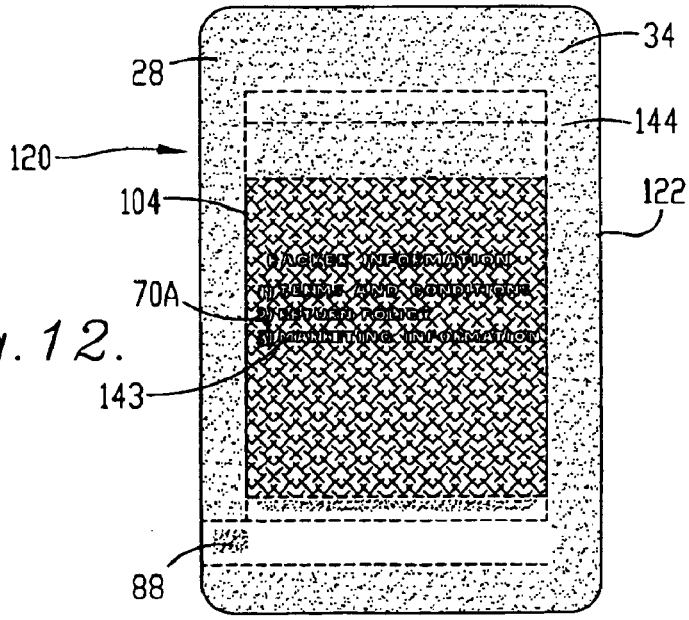
FIG. 12 is a view of the inner face of the face ply to show the pattern of adhesive applied to the face ply.

Adhesive 34 is applied to the inner face 28 in an adhesive pattern 144 as shown by the shaded area in FIG. 12. The adhesive pattern extends into the central portion but does not extend to the address label 64, that is, the area bounded by perforation lines 80, 82, 140 and 142, and preferably about a 1 to 2 mm adhesive-free area is provided between any adhesive and the perforation lines 80, 82, 84, 140, 142 and tear strip perforation lines 74 and 76. The masking area 104 is shown as reverse printing indicia 143, i.e. the printing within the masking area creates indicia by the absence of ink, whereby both masking of the content indicia 112 and additional preprinted instruction indicia 70a may be provided on the face ply 122. The masking area 104 is shown as only extending across inner face of the address label 64, but it may be understood that the masking area could extend to the inner face of the return label 136, the pull tabs 132 and 134, or indeed the border portion 66 if desired.

Figure 13:
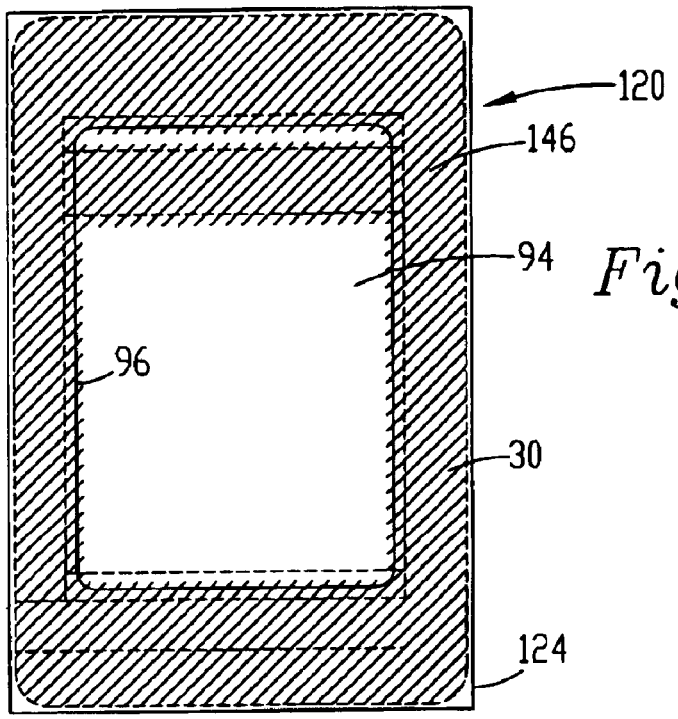
FIG. 13 is a view of the release face of the release liner showing the pattern of application release coating.

FIG. 13 shows the release pattern 146 of release coating 36 applied to the release face 30 of the release liner 124, with the dotted lines showing the margin and perforation lines of the face ply 122 for purposes of comparison and to show the registry between the face ply 122 and the release liner 124.

Figure 14:
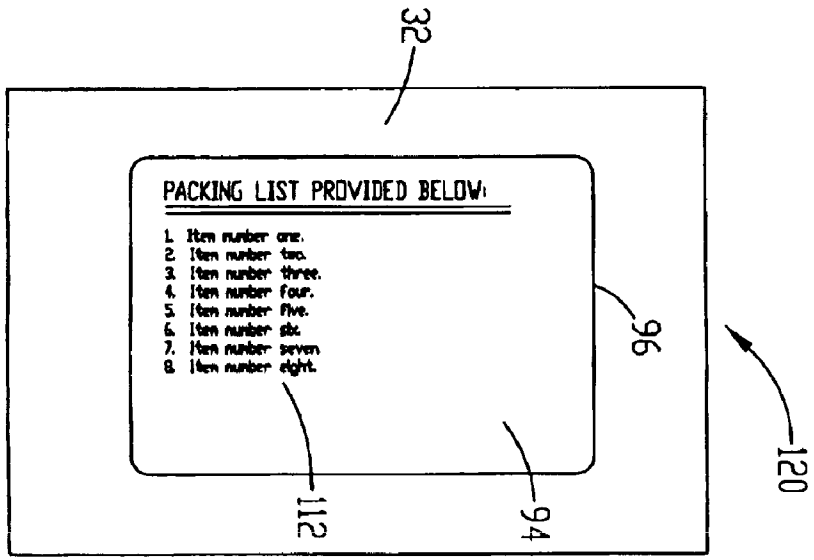
FIG. 14 is a view of the back face of the release coating to show the packing label information thereon.

The diagonal lines show the coverage of the release pattern 146, which may also extend about 1 mm across the die cut line of separation 96 if desired to assist in the separation of the packing slip 94 if the pattern of adhesive 144 is slightly misaligned, or outwardly to the perimeter of the release liner. As shown in FIG. 14, the back face 32 of the release liner 124 is provided with individualized indicia 108, such as the content indicia 112 shown. Form 120 permits the preprinted indicia 68 to include return address identifying indicia 72a and the additional preprinted instruction indicia 70a, as well as instruction indicia 70 and identifying indicia 72 as shown with reference to form 20.

Form 120 is made similarly to form 20 in that the face ply 122 and release liner 124 are initially printed with the preprinted indicia 68, adhesive is applied in the desired pattern 144 to the inner face 28 and release coating 36 is applied in the desired release pattern 146 either to the release face 30 or to the inner face 28 after the adhesive pattern 144 has been applied, and the face ply 122 is mated in registry to the release liner 124. The continuous web 38 of the mated face ply 122 and release liner 124 is then perforated through die cutting, perforation wheels or other conventional mechanisms, and the line of separation 96 is applied to the release liner 124 to provide the packing slip 94. As noted above, the continuous web 38 may be cross perforated or individual forms 120 provided by cutting into separate cut sheets as shown in FIGS. 10, 12, 13 and 14. FIG. 10 shows the use of a control number indicia 148 and a bar code indicia 150 to provide additional ease of internal accounting by the sender.

Form 120 is also used similarly to form 20. Individualized indicia 108 including address indicia 110 and content indicia 112 are respectively printed on the top face 26 and the back face 32 are printed by printer 106 at the time of use, preferably by using computerized information regarding the recipient. The protective border 100 is then peeled away so that the form 120 may be adhesively secured to a substrate, such as package 114, with the top face 26 bearing the address label 64 with instruction indicia 70 and identifying indicia 72 as well as address indicia 110 visible, but content indicia on back face 32 hidden and masked by masking area 104.

The recipient may grasp and pull the tear strip along tear strip perforation lines 74 and 76. Adhesive 34 directly contacts portions of the face ply 122 and release liner 124 within the pull tabs 132 and 133 without intervention of a release coating to provide two plys and reinforcement when the central portion 130 including the packing slip 94 are torn free from the border portion 66. However, in form 120, adhesive pattern 144 does not extend on the inner face 28 of the face ply 122 within the address label 64, so that the address label 64 may be separated along perforation lines 140 and 142 from the pull tabs 132 and 134 and thus also from the packing slip 94. This enables the instruction indicia 70a provided by the reverse printing within the masking area 104 to be visible to the recipient, thereby providing an additional printed surface as shown in FIG. 12 while retaining the reinforcement provided by the two-ply pull tabs 132 and 134 and the masking function inhibiting viewing of the content indicia 112 until the packing slip 94 is torn free.

Applicant has shown the form 20 as a continuous form with tractor feed strips and form 120 as a cut-sheet form. The particular manner of production is intended to illustrate examples, rather than limitations as to the size or whether multiple forms or continuous forms are attached to one another. For example, form 20 is readily useful without the tractor feed strips shown, either as a continuous form which may be fan-folded or provided on rolls, or as a cut-sheet form. As a cut sheet form, for example, form elements 20A and 20B may be provided on a single standard-sized 8.5 inch by 11 inch sheet without the need for feed strips 44 and 46 and separated by a cross-perforation line 20, although the size of the sheet is not intended to be limiting. Similarly, form 120 may be provided not as a single cut-sheet form, but also as a continuous form as shown with respect to form 20, which may be fan-folded or provided on a roll, or multiple forms 120 may be provided on a single sheet as described above.

Although preferred forms of the invention have been described above, it is to be recognized that such disclosure is by way of illustration only, and should not be utilized in a limiting sense in interrupting the scope of the present invention. Obvious modifications to the exemplary embodiments, as hereinabove set forth, could be readily made by those skilled in the art without departing from the spirit of the present invention. For example, the masking area 104 can be printed on either the inner face of the top ply or the release face of the release liner, and may extend beyond the central portion and across the border portion. The adhesive may be applied in a continuous coating or a pattern coating within the adhesive pattern depending on the degree of adhesion desired. It may also be appreciated that scoring of other weakening may be used in place of perforation lines to provide lines of weakening, and that such lines of weakening can be used in place of lines of separation. Additionally, the perforation lines need not be straight lines as shown, but can be arcuate or in other shapes as desired.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. A method of labeling a package, comprising the steps of:

providing a form having a face ply with a top face and an inner face and having lines of perforation therein for separating the face ply into a central area and a border portion, a release liner having a release face and a back face and including a line of separation dividing the release liner into a substantially centrally located slip and a surrounding protective border; a pattern of adhesive applied between said inner face and said release face including between at least some of said border portion and said protective border and between at least some of a central portion and said slip, and a pattern of release coating applied between some of said adhesive pattern and some of said release face but including a release coating free zone to permit direct adhesive connection between at least a part of said central portion and a part of said slip;

printing first individualized indicia on said top face within said central portion and second individualized indicia on said back face of said slip;

removing said protective border to expose the adhesive on said border portion while leaving said slip adhesively connected to said face ply;

applying said form to a substrate;

tearing said central portion from said border portion; and removing said central portion and said slip while leaving said border portion adhered to said substrate.

2. A method as set forth in claim 1, wherein said first and second individualized indicia are simultaneously printed respectively on said top face and said back face.

3. A method as set forth in claim 1, wherein said central portion is directly adhered to said slip.

4. A method as set forth in claim 1, wherein said central portion is divided by perforation lines to provide at least one pull tab including a portion of said central portion and a portion of said slip directly adhered to one another and a label portion separable from said slip portion, and including the step of separating said slip from said label after tearing said central portion from said border portion.

*5. A method of labeling a package that is to contain contents to be delivered to a recipient, the package labeling method comprising the steps of:*

(*a*) *printing recipient address indicia on a top surface of a label;*

(*b*) *printing package contents indicia on an opposite bottom surface of the label,*

*steps* (*a*) *and* (*b*) *further including providing the label with the address and contents indicia on the respective, oppositely facing surfaces of the label prior to being affixed to the package; and*

(*c*) *affixing the label to the package so that the top surface is oriented outwardly to reveal the address indicia and to thereby facilitate delivery of the package to the recipient and so that the bottom surface is oriented toward the package to conceal the package contents indicia,*

*steps* (*a*) *and* (*b*) *being performed simultaneously such that the opposite surfaces are printed in one pass through a duplex thermal printer.*

*6. A method of labeling a package that is to contain contents to be delivered to a recipient, the package labeling method comprising the steps of:*

(*a*) *printing recipient address indicia on a top surface of a label;*

(*b*) *printing package contents indicia on an opposite bottom surface of the label,*

*steps* (*a*) *and* (*b*) *further including providing the label with the address and contents indicia on the respective, oppositely facing surfaces of the label prior to being affixed to the package; and*

(*c*) *affixing the label to the package so that the top surface is oriented outwardly to reveal the address indicia and to thereby facilitate delivery of the package to the recipient and so that the bottom surface is oriented toward the package to conceal the package contents indicia,*

*step* (*c*) *including the steps of removing at least part of a release liner from a face ply of the label, wherein a top face of the face ply defines the top surface and an opposite inner face of the face ply carries an adhesive thereon that is exposed when the at least part of the release liner is removed, and placing the inner face of the face ply against the package.*

*7. A package labeling method as claimed in claim 6,*

*step* (*c*) *including the step of retaining a section of the release liner on the face ply, wherein a front face of the liner section is oriented toward the face ply and an opposite back face of the liner section defines the bottom surface.*

*8. A method of labeling a package that is to contain contents to be delivered to a recipient, the package labeling method comprising the steps of:*

(*a*) *printing recipient address indicia on a top surface of a label;*

(*b*) *printing package contents indicia on an opposite bottom surface of the label,*

*steps* (*a*) *and* (*b*) *further including providing the label with the address and contents indicia on the respective, oppositely facing surfaces of the label prior to being affixed to the package;*

(*c*) *affixing the label to the package so that the top surface is oriented outwardly to reveal the address indicia and to thereby facilitate delivery of the package to the recipient and so that the bottom surface is oriented toward the package to conceal the package contents indicia; and*

(*d*) *providing the label with a return label section having sender address indicia thereon.*

*9. A method of labeling a package that is to contain contents to be delivered to a recipient, the package labeling method comprising the steps of:*

(*a*) *printing recipient address indicia on a top surface of a label;*

(*b*) *printing package contents indicia on an opposite bottom surface of the label,*

*steps* (*a*) *and* (*b*) *further including providing the label with the address and contents indicia on the respective, oppositely facing surfaces of the label prior to being affixed to the package;*

(*c*) *affixing the label to the package so that the top surface is oriented outwardly to reveal the address indicia and to thereby facilitate delivery of the package to the recipient and so that the bottom surface is oriented toward the package to conceal the package contents indicia; and*

(*d*) *providing a central portion in the label defined by a line of weakness located inboard of an outer edge of the label.*

* * * * *